(12) United States Patent     (10) Patent No.:    US 8,482,547 B2
Christiansson et al.               (45) Date of Patent:      Jul. 9, 2013

(54) DETERMINING THE LOCATION OF ONE OR MORE OBJECTS ON A TOUCH SURFACE

(75) Inventors: Tomas Christiansson, Torna-Hallestad (SE); Ola Wassvik, Lund (SE); Mattias Bryborn, Lund (SE)

(73) Assignee: Flatfrog Laboratories AB, Lund (SE)

( * ) Notice: Subject to any disclaimer, the term of this patent is extended or adjusted under 35 U.S.C. 154(b) by 155 days.

(21) Appl. No.: 12/737,016

(22) PCT Filed: Jun. 22, 2009

(86) PCT No.: PCT/EP2009/057724
§ 371 (c)(1),
(2), (4) Date: Dec. 2, 2010

(87) PCT Pub. No.: WO2010/006883
PCT Pub. Date: Jan. 21, 2010

(65) Prior Publication Data
US 2011/0090176 A1     Apr. 21, 2011

Related U.S. Application Data

(60) Provisional application No. 61/129,372, filed on Jun. 23, 2008, provisional application No. 61/202,208, filed on Feb. 5, 2009.

(30) Foreign Application Priority Data

Jun. 23, 2008   (SE) ..................................... 0801467
Feb. 5, 2009   (SE) ..................................... 0900138

(51) Int. Cl.
*G06F 3/042*      (2006.01)
(52) U.S. Cl.
USPC ........................................ 345/175; 178/18.09
(58) Field of Classification Search
USPC ................................ 345/175–176; 178/18.09
See application file for complete search history.

(56) References Cited

U.S. PATENT DOCUMENTS 3,553,680 A    1/1971    Cooreman
3,673,327 A    6/1972    Johnson et al.
(Continued)

FOREIGN PATENT DOCUMENTS

CN        101075168        11/2007
EP          0 897 161          2/1999
(Continued)

OTHER PUBLICATIONS

U.S. Office Action dated Apr. 2, 2012 issued in U.S. Appl. No. 12/737,019.
(Continued)

*Primary Examiner* — Bipin Shalwala
*Assistant Examiner* — Matthew Fry
(74) *Attorney, Agent, or Firm* — Harness, Dickey & Pierce, P.L.C.

(57) ABSTRACT

A device operates on output signals from a light sensor arrangement in a touch-sensing apparatus to determine a position of an object on a touch surface. The apparatus includes a light transmissive panel that defines the touch surface and an opposite surface. A light source arrangement provides sheets of light inside the panel, wherein each sheet comprises light that propagates by internal reflection between the touch surface and the opposite surface from one or more incoupling points to a set of outcoupling points. The light sensor arrangement generates the output signals, which represent light reaching the outcoupling points. The apparatus is configured such that an object touching the touch surface locally attenuates at least two sheets of light. To determine the position, the device identifies, in the output signals, a set of signal profiles originating from said object. The device determines at least part of an attenuated light path across the panel based on each signal profile, and identifies the position of the object on the touch surface based on the thus-determined attenuated light paths. In determining the attenuated light path, the device applies a predetermined width function which is representative of a dependence of signal profile width on distance to the incoupling point due to light scattering caused by at least one of the touch surface and the opposite surface.

20 Claims, 10 Drawing Sheets

U.S. PATENT DOCUMENTS

| | | | |
|---|---|---|---|
| 4,129,384 A | 12/1978 | Walker et al. | |
| 4,213,707 A | 7/1980 | Evans, Jr. | |
| 4,294,543 A | 10/1981 | Apple et al. | |
| 4,420,261 A | 12/1983 | Barlow et al. | |
| 4,507,557 A | 3/1985 | Tsikos | |
| 4,521,112 A | 6/1985 | Kuwabara et al. | |
| 4,746,770 A * | 5/1988 | McAvinney | 178/18.09 |
| 5,383,022 A | 1/1995 | Käser | |
| 5,570,181 A | 10/1996 | Yasuo et al. | |
| 5,764,223 A * | 6/1998 | Chang et al. | 345/175 |
| 6,492,633 B2 * | 12/2002 | Nakazawa et al. | 250/221 |
| 6,972,753 B1 | 12/2005 | Kimura et al. | |
| 7,176,904 B2 * | 2/2007 | Satoh | 345/173 |
| 7,629,968 B2 | 12/2009 | Miller et al. | |
| 8,218,154 B2 * | 7/2012 | Ostergaard et al. | 356/614 |
| 2001/0002694 A1 * | 6/2001 | Nakazawa et al. | 250/221 |
| 2002/0067348 A1 | 6/2002 | Masters et al. | |
| 2003/0160155 A1 | 8/2003 | Liess | |
| 2004/0174541 A1 | 9/2004 | Freifeld | |
| 2004/0252091 A1 * | 12/2004 | Ma et al. | 345/87 |
| 2005/0128190 A1 * | 6/2005 | Ryynanen | 345/173 |
| 2005/0200613 A1 * | 9/2005 | Kobayashi et al. | 345/175 |
| 2006/0017709 A1 | 1/2006 | Okano | |
| 2006/0114237 A1 | 6/2006 | Crockett et al. | |
| 2006/0139340 A1 * | 6/2006 | Geaghan | 345/177 |
| 2006/0227120 A1 | 10/2006 | Eikman | |
| 2007/0052684 A1 | 3/2007 | Gruhlke et al. | |
| 2008/0252619 A1 * | 10/2008 | Crockett et al. | 345/175 |
| 2009/0135162 A1 * | 5/2009 | Van De Wijdeven et al. | 345/175 |
| 2009/0219256 A1 * | 9/2009 | Newton | 345/173 |
| 2010/0045629 A1 * | 2/2010 | Newton | 345/173 |
| 2010/0079407 A1 * | 4/2010 | Suggs | 345/175 |
| 2010/0193259 A1 * | 8/2010 | Wassvik | 178/18.09 |

FOREIGN PATENT DOCUMENTS

| | | |
|---|---|---|
| EP | 1 752 864 | 2/2007 |
| GB | 2 131 544 | 6/1984 |
| WO | WO 01/84251 | 11/2001 |
| WO | WO 2006/095320 | 9/2006 |
| WO | WO 2007/112742 | 10/2007 |
| WO | WO 2008/039006 | 4/2008 |
| WO | WO 2008/068607 | 6/2008 |
| WO | WO 2009/048365 | 4/2009 |
| WO | WO 2010/006882 | 1/2010 |
| WO | WO 2010/006884 | 1/2010 |
| WO | WO 2010/006885 | 1/2010 |
| WO | WO 2010/006886 | 1/2010 |

OTHER PUBLICATIONS

U.S. Office Action dated Apr. 24, 2012 issued in U.S. Appl. No. 12/737,018.

International Search Report dated Oct. 7, 2010 for International application No. PCT/EP2009/057725.

Liu J., et al., "Multiple touch points identifying method, involves starting touch screen, driving specific emission tube, and computing and transmitting coordinate of touch points to computer system by direct lines through interface of touch screen", vol. 2008, No. 28, Nov. 21, 2007.

International Search Report dated Jan. 4, 2011 for International application No. PCT/EP2009/057731.

International Search Report dated Oct. 7, 2011 for International application No. PCT/EP2009/057725.

International Search Report dated Oct. 15, 2010 for International application No. PCT/EP2009/057724.

International Search Report dated Oct. 7, 2010 for International application No. PCT/EP2009/057728.

International Search Report dated Feb. 11, 2010 for International application No. PCT/EP2009/057723.

U.S. Office Action dated Feb. 27, 2013 issued in U.S. Appl. No. 12/737,018.

U.S. Office Action dated Feb. 28, 2013 issued in U.S. Appl. No. 12/737,019.

* cited by examiner

DETERMINING THE LOCATION OF ONE OR MORE OBJECTS ON A TOUCH SURFACE

CROSS-REFERENCE TO RELATED APPLICATIONS

The present application claims the benefit of Swedish patent application No. 0801467-2, filed on Jun. 23, 2008. U.S. provisional application No. 61/129,372, filed on Jun. 23, 2008, Swedish patent application No. 0900138-9, filed on Feb. 5, 2009, and U.S. provisional application No. 61/202, 208, filed on Feb. 5, 2009, all of which are incorporated herein by reference.

TECHNICAL FIELD

The present invention relates to touch-sensitive panels and data processing techniques in relation to such panels.

BACKGROUND ART

To an increasing extent, touch-sensitive panels are being used for providing input data to computers, electronic measurement and test equipment, gaming devices, etc. The panel may be provided with a graphical user interface (GUI) for a user to interact with using e.g. a pointer, stylus or one or more fingers. The GUI may be fixed or dynamic. A fixed GUI may e.g. be in the form of printed matter placed over, under or inside the panel. A dynamic GUI can be provided by a display screen integrated with, or placed underneath, the panel or by an image being projected onto the panel by a projector.

There are numerous known techniques for providing touch sensitivity to the panel, e.g. by using cameras to capture light scattered off the point(s) of touch on the panel, or by incorporating resistive wire grids, capacitive sensors, strain gauges, etc into the panel.

US2004/0252091 discloses an alternative technique which is based on frustrated total internal reflection (FTIR). Light is coupled into a panel to propagate inside the panel by total internal reflection. Arrays of light sensors are located around the perimeter of the panel to detect the light. When an object comes into contact with a surface of the panel, the light will be locally attenuated at the point of touch. The location of the object is determined by triangulation based on the attenuation of the light from each source at the array of light sensors.

U.S. Pat. No. 3,673,327 discloses a similar technique in which arrays of light beam transmitters are placed along two edges of a panel to set up a grid of intersecting light beams that propagate through the panel by internal reflection. Corresponding arrays of beam sensors are placed at the opposite edges of the panel. When an object touches a surface of the panel, the beams that intersect at the point of touch will be attenuated. The attenuated beams on the arrays of detectors directly identify the location of the object.

In order for these FTIR devices to gain acceptance in the market, they must be operable in real-life situations. For example, after some use, it is likely that the touch surface becomes contaminated by deposits, such as fingerprints, fluids, dust, etc. Such contaminants may reduce the performance of the FTIR device. There is thus a general desire to design FTIR devices that provide adequate performance in terms of ability to determine the location and optionally also the size of one or more touching objects, with adequate precision even after substantial use in a real-life environment.

SUMMARY OF THE INVENTION

It is an object of the invention to at least partly overcome one or more of the above-identified limitations of the prior art.

This and other objects, which may appear from the description below, are at least partly achieved by means of a method, a computer program product, a device for determining positions, and a touch-sensing apparatus according to the independent claims, embodiments thereof being defined by the dependent claims.

A first aspect of the invention is a method in a touch-sensing apparatus, which comprises a light transmissive panel that defines a touch surface and an opposite surface, and a light source arrangement for providing sheets of light inside the panel, wherein each sheet comprises light that propagates by internal reflection between the touch surface and the opposite surface from one or more incoupling points to a set of outcoupling points. The apparatus further comprises a light sensor arrangement for generating one or more output signals that represent light reaching the outcoupling points, wherein the touch-sensing apparatus is configured such that an object touching the touch surface locally attenuates at least two sheets of light. The method comprises: identifying, in said output signal(s), a set of signal profiles originating from said object; determining at least part of an attenuated light path across the panel based on each signal profile; and identifying the position of the object on the touch surface based on the thus-determined attenuated light paths. In this method, the attenuated light paths are determined by applying a predetermined width function which is representative of a dependence of signal profile width on distance to the incoupling point due to light scattering caused by at least one of the touch surface and the opposite surface.

By applying the width function, it is possible to reduce or essentially eliminate any negative impact of light scattering on the ability of the touch-sensing apparatus to determine the position of the object. In fact, by accounting for light scattering at the touch surface and/or the opposite surface, the inventive method makes it possible to deliberately add a light scattering structure to the touch surface or the opposite surface, in order to reduce the influence of fingerprints and other deposits, as well as scratches, that may occur during use of the touch-sensing apparatus. Alternatively or additionally, the impact of light scattering caused by deposits may be accounted for by intermittently measuring/estimating the width function during use of the touch-sensing apparatus, and then applying the thus-obtained width function in the determination of attenuation paths.

Since the inventive method enables determination of attenuation paths that are more or less corrected for the influence of light scattering, it should be understood that the method enables determination of both the position and the true size/area/shape of a touching object. By the same token, the method can be used to improve the position determination when multiple (two or more) objects are brought in contact with the touch surface. For multiple objects, the position determination will result in a larger number of candidate touch points than the actual number of objects. Thus, the candidate touch points will contain both true touch points and ghost touch points. As noted above, the inventive method makes it possible to determine the size/area/shape of the candidate touch points. The thus-determined size/area/shape can be used to validate the candidate touch points, so as to distinguish between ghost touch points and true touch points. Thus, the inventive method may improve the precision of the positions determined for multiple touching objects, and the method may also increase the number of touches than can be resolved for a given number of light sheets and/or outcoupling points of the touch-sensing apparatus.

In one embodiment, the width function represents the factual width of the object given the detected signal profile, as a function of distance to the incoupling point.

In one embodiment, at least one of the sheets is generated by sweeping an essentially collimated beam across a set of incoupling points on the panel.

In one embodiment, said determining comprises, for each signal profile: reconstructing a center ray of the attenuated light path by geometrically retracing a center point of the signal profile to one of said incoupling points; determining a signal width of the signal profile; and determining an object width at one or more candidate positions along the center ray by applying said width function, thereby determining part of said attenuated light path. Here, said one or more candidate positions may be determined by triangulation using a set of center rays that are reconstructed from said set of signal profiles.

In one embodiment, at least one of the sheets is generated in the form of a diverging beam originating at the one or more incoupling points. In such an embodiment, said determining may comprise, for each signal profile associated with said at least one sheet generated in the form of a diverging beam: identifying outcoupling points corresponding to limits of the signal profile; reconstructing limiting rays of the attenuated light path by geometrically retracing the thus-identified outcoupling points to a respective incoupling point; and modifying the distance between the limiting rays by applying said width function, thereby determining the attenuated light path.

In one embodiment, said determining results in a set of candidate positions, and wherein said identifying the positions comprises: calculating a shape measure and/or an area measure for at least one candidate position based on the thus-determined attenuated light paths; and validating said at least one candidate position based on the shape measure and/or area measure.

A second aspect of the invention is a computer program product comprising computer code which, when executed on a data-processing system, is adapted to carry out the method of the first aspect.

A third aspect of the invention is a device for determining a position of an object on a touch surface included in a touch-sensing apparatus, which comprises a light transmissive panel that defines the touch surface and an opposite surface, a light source arrangement for providing sheets of light inside the panel, wherein each sheet comprises light that propagates by internal reflection between the touch surface and the opposite surface from one or more incoupling points to a set of outcoupling points, a light sensor arrangement for generating one or more output signals that represent light reaching the outcoupling points, wherein the touch-sensing apparatus is configured such that an object touching the touch surface locally attenuates at least two sheets of light. The device comprises: an element for identifying, in said output signal(s), a set of signal profiles originating from the object; an element for determining at least part of an attenuated light path across the panel based on each signal profile; and an element for identifying the position of the object on the touch surface based on the thus-determined attenuated light paths. The determining element is configured to apply a predetermined width function which is representative of a dependence of signal profile width on distance to the incoupling point due to light scattering caused by at least one of the touch surface and the opposite surface.

A fourth aspect of the invention is a touch-sensing apparatus, comprising: a light transmissive panel that defines a touch surface and an opposite surface; a light source arrangement for providing sheets of light inside the panel, wherein each sheet comprises light that propagates by internal reflection between the touch surface and the opposite surface from one or more incoupling points to a set of outcoupling points; a light sensor arrangement for generating one or more output signals that represent light reaching the outcoupling points, wherein the touch-sensing apparatus is configured such that an object touching the touch surface locally attenuates at least two sheets of light; and a device for determining a position according to the third aspect.

Any one of the embodiments of the first aspect can be combined with the second to fourth aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Figure 1A:
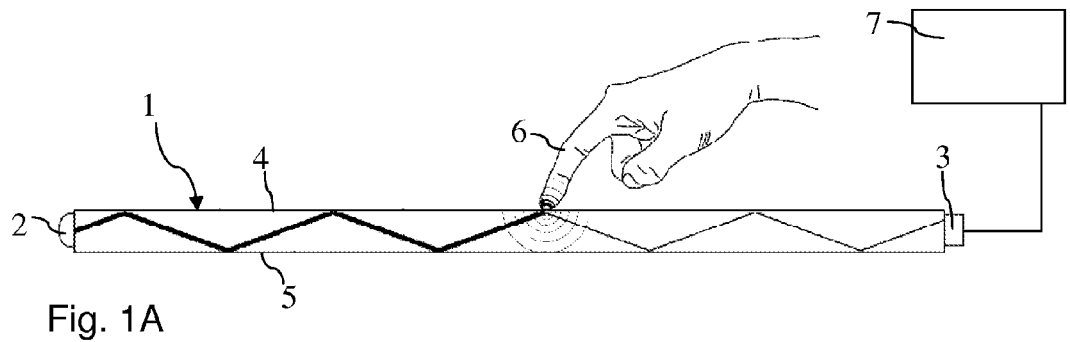
FIG. 1A is a side view of a touch-sensing apparatus.

The present invention relates to techniques for detecting the location of an object on a touch surface of a touch-sensing apparatus. The description starts out by presenting the use of frustrated total internal reflection (FTIR) for touch determination, in relation to a number of exemplifying arrangements for illuminating the interior of a light transmissive panel. Then, the influence of signal dispersion caused by scattering in the light transmissive panel is discussed. Finally, the use of signal dispersion for improving the touch determination process is discussed in relation to two principal arrangements for illuminating the light transmissive panel.

Throughout the description, the same reference numerals are used to identify corresponding elements.

FIG. 1A is a side view of an exemplifying arrangement in a touch-sensing apparatus. The arrangement includes a light transmissive panel 1, one or more light emitters 2 (one shown) and one or more light sensors 3 (one shown). The panel defines two opposite and generally parallel surfaces 4, 5 and may be planar or curved. A radiation propagation channel is provided between two boundary surfaces of the panel, wherein at least one of the boundary surfaces allows the propagating light to interact with a touching object 6. Typically, the light from the emitter(s) 2 propagates by total internal reflection (TIR) in the radiation propagation channel, and the sensors 3 are arranged at the periphery of the panel 1 to generate a respective output signal which is indicative of the energy of received light.

As shown in FIG. 1A, the light may be coupled into and out of the panel 1 directly via the edge portion that connects the top and bottom surfaces 4, 5 of the panel 1. Alternatively, a separate coupling element (e.g. in the shape of a wedge) may be attached to the edge portion or to the top or bottom surface 4, 5 of the panel 1 to couple the light into and/or out of the panel 1. When the object 6 is brought sufficiently close to the boundary surface, part of the light may be scattered by the object 6, part of the light may be absorbed by the object 6, and part of the light may continue to propagate unaffected. Thus, when the object 6 touches a boundary surface of the panel (e.g. the top surface 4), the total internal reflection is frustrated and the energy of the transmitted light is decreased.

The location of the touching object 6 may be determined by measuring the energy of the light transmitted through the panel 1 from a plurality of different directions. This may, e.g., be done by operating a number of spaced-apart emitters 2 to generate a corresponding number of sheets of light inside the panel 1, and by operating the sensors 3 to detect the energy of the transmitted energy of each sheet of light. As long as the touching object attenuates at least two sheets of light, the position of the object can be determined by triangulation. In the embodiment of FIG. 1A, a data processing device 7 is configured to process the output signal(s) from the sensor(s) 3 to determine the location of the touching object 6.

As indicated in FIG. 1A, the light will not be blocked by the touching object 6. Thus, if two objects happen to be placed after each other along a light path from an emitter 2 to a sensor 3, part of the light will interact with both objects. Provided that the light energy is sufficient, a remainder of the light will reach the sensor 3 and generate an output signal that allows both interactions (touch points) to be identified. Normally, each such touch point has a transmission in the range 0-1, but normally in the range 0.7-0.99. The total transmission T along a light path is the product of the individual transmissions $t_n$ of the touch points on that light path: $T=\Pi\, t_n$. Thus, it may be possible for the data processing device 7 to determine the locations of multiple touching objects, even if they are located in line with a light path.

Figure 1B:
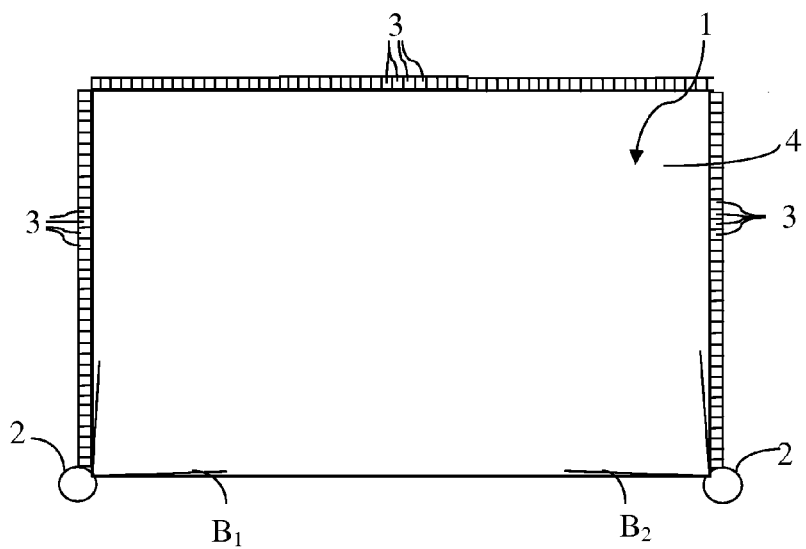
FIG. 1B is a top plan view of a fan beam embodiment of such a touch-sensing apparatus.
Figure 1C:
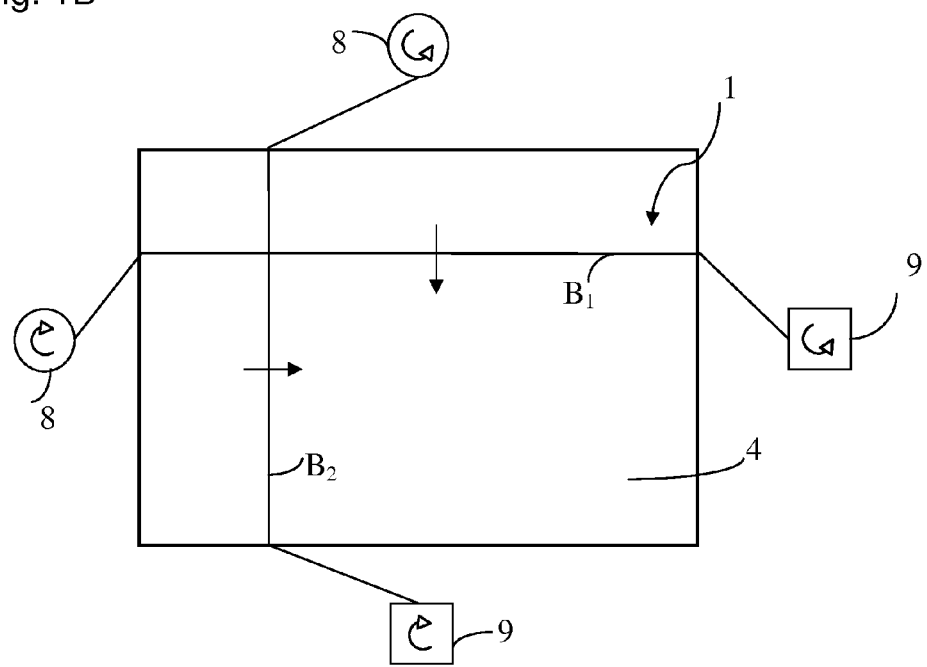
FIG. 1C is a top plan view of a scan beam embodiment of such a touch-sensing apparatus.

FIGS. 1B and 1C illustrate exemplary light source arrangements for generating sheets of light inside the light transmissive panel 1, and light sensor arrangements for detecting the transmitted energy of each sheet.

In the embodiment of FIG. 1B, light from two spaced-apart emitters 2 is coupled into the panel 1 to propagate inside the panel 1 by total internal reflection. Each emitter 2 generates a beam B1, B2 of light that expands in the plane of the panel 1 while propagating away from the emitter 2. Such a beam is denoted fan beam, and this type of embodiment is generally referred to as a "fan beam embodiment" in the following. Each fan beam B1, B2 propagates from one or more entry or incoupling points within an incoupling site on the panel 1 to form a sheet of light, which in this example is distributed essentially throughout the entire panel 1. Arrays of light sensors 3 are located around the perimeter of the panel 1 to receive the light from the emitters 2 at a number of spaced-apart outcoupling points within an outcoupling site on the panel 1. The location of the object is determined by triangulation based on the attenuation of the light from each emitter 2 at the array of light sensors 3. This type of touch-sensing apparatus is, e.g., known from aforesaid US2004/0252091, which is incorporated herein by reference.

In the embodiment of FIG. 1C, two collimated beams B1, B2 are swept across the panel in two different directions, and the energy of each transmitted beam is measured during the sweep. This type of embodiment is generally referred to as a "scan beam embodiment" in the following. The sweeping of a collimated beam B1, B2 forms a sheet of light. Specifically, each beam B1, B2 is generated and swept along a set of entry or incoupling points within an incoupling site on the panel 1 by an input scanner arrangement 8. In the illustrated example, the entry points are located at the left and top edges of the panel 1. The transmitted energy at a number of outcoupling points within an outcoupling site on the panel 1 is measured by an output scanner arrangement 9 which is synchronized with the input scanner arrangement 8 to receive the beam B1, B2 as it is swept across the panel 1. In the illustrated example, the outcoupling points are located at the right and bottom edges of the panel 1 opposite to the entry points.

Each output scanner arrangement 9 typically includes a beam scanner and one light sensor (not shown). Similarly, each input scanner arrangement 8 typically includes a light emitter and a beam scanner (not shown). However, it is conceivable that two or more input scanner arrangements share one and the same light emitter, and/or that two or more output scanner arrangements share one and the same light sensor. It is also to be understood that more than two beams can be swept across the panel. Typically, the beams are translated across the panel, i.e. they have an essentially invariant angle (scan angle) in the plane of the panel. Although not shown in FIG. 1C, dedicated optical components are associated with the incoupling and outcoupling sites to re-direct the incoming light from input scanner arrangement 8 into a desired direction ("scan angle") and to re-direct the transmitted light towards a common focal area/point on the output scanner arrangement 9, respectively. In the example of FIG. 1C, the beams B1, B2 are essentially parallel to a respective edge of the panel 1. However, it is conceivable that the scan angle of the beams B1, B2 change as they are swept across the panel 1. The illustrated embodiment and alternative configurations thereof are further disclosed in Applicant's U.S. provisional applications No. 61/129,372 and No. 61/129,373, both filed on Jun. 23, 2008 and incorporated herein by reference.

In an alternative (not shown) to the embodiment in FIG. 1C, each output scanner arrangement 9 and the redirecting optical components are replaced by a respective elongate sensor, which extends along the panel edge and is optically connected to the panel. Each such elongate sensor is controlled to measure the received energy as a function of time, while a beam is swept along an incoupling site on the panel. Thus, similarly to the embodiment in FIG. 1C, the transmitted energy is measured at a number of outcoupling points within an outcoupling site on the panel, wherein the outcoupling points correspond to different time points in the output signal of the elongate sensor. In a variant, the redirecting optical components are retained but each output scanner arrangement 9 is replaced by a stationary radiation detector, which is arranged in the aforesaid common focal area/point, spaced from the panel edge. In this variant, the stationary radiation detector is controlled to measure the received energy as a function of time, while a beam is swept along an incoupling site on the panel. Such alternatives and variants are further disclosed in Applicant's U.S. provisional application No. 61/202,874, filed on Apr. 15, 2009 and incorporated herein by reference.

In a further alternative (not shown) to the embodiment in FIG. 1C, the output scanner arrangements 9 are omitted and replaced by retro-reflectors, such that the beams B1, B2 are reflected back to the respective input scanner arrangement 8. Thus, the input scanner arrangements 8 are configured as transceivers that both sweep and receive a beam, to measure the transmitted energy. Such alternatives are further disclosed in Applicant's PCT application WO 2009/048365, which is incorporated herein by reference.

Figure 2A:
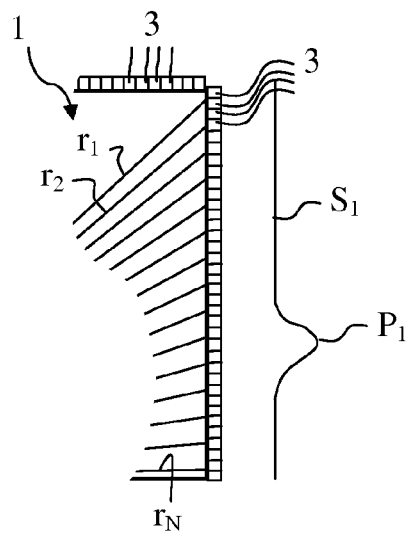
FIG. 2A illustrates a spatial transmission signal generated in a fan beam embodiment.

In all of the above embodiments, the output signals of the sensor(s) 3 may be aggregated into a spatial transmission signal for each sheet of light. The spatial transmission signal represents the received energy at different locations around the perimeter of the panel. The spatial transmission signal could optionally be normalized by a background signal to represent the true transmission of light at the different locations, as will be further exemplified below. FIG. 2A illustrates a spatial transmission signal obtained from the array of sensors 3 at the right-end panel edge of the embodiment in FIG. 1B. FIG. 2A also schematically illustrates a set of idealized light rays r1, . . . rN in the sheet of light that is generated by the bottom left-side emitter in FIG. 1A. It should be understood that the spatial resolution of the transmission signal S1 depends, i.a., on the density of sensors 3 in the array of sensors. The transmission signal S1 is illustrated to contain a signal profile P1 that originates from a touching object (not shown). Such a signal profile P1 is also denoted "touch signature" in the following.

Figure 2B:
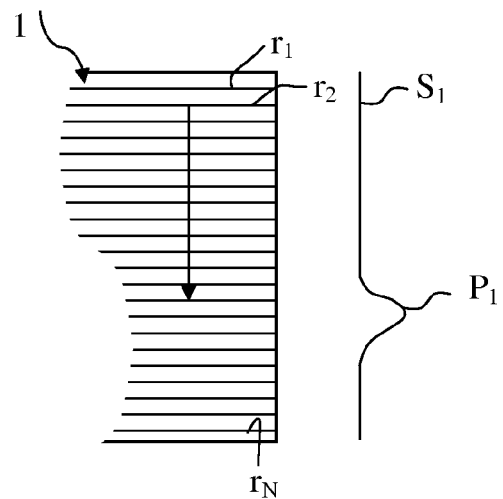
FIG. 2B illustrates a spatial transmission signal generated in a scan beam embodiment.

FIG. 2B illustrates a spatial transmission signal S1 obtained from the right-end output scanner arrangement 9 in FIG. 1C, or any of the alternatives thereof as discussed above. FIG. 2B also schematically illustrates a set of instances r1, . . . , rN of the center ray of a light beam while it is swept across the panel 1. The spatial transmission signal S1 could, e.g., be given as a function of scanning angle or time, which is equivalent to location along the right-end edge of the panel 1. It should be understood that the spatial resolution of the transmission signal S1 depends, i.a., on the sampling rate of the output scanner arrangement 9. The transmission signal S1 is also illustrated to contain a touch signature P1 of a touching object (not shown).

Figure 2C:
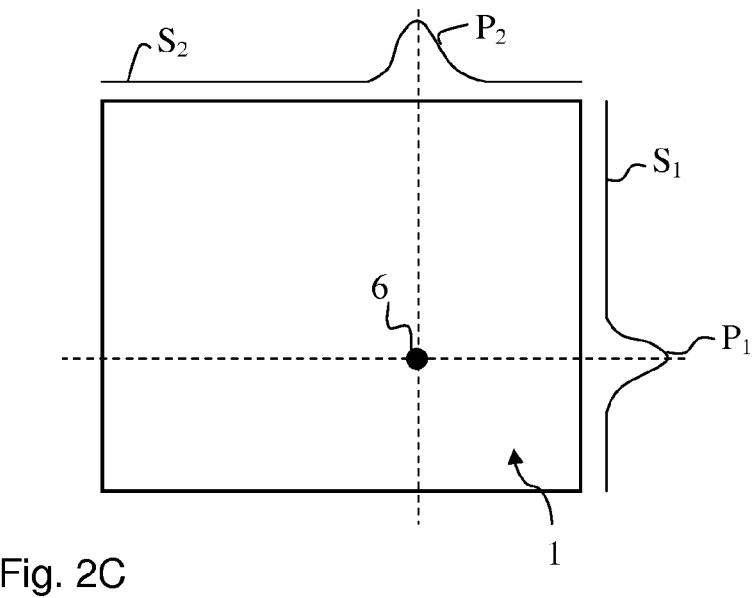
FIG. 2C illustrates decoding by triangulation.

To further illustrate the process for determining the location of a touching object, FIG. 2C illustrates two spatial transmission signals S1, S2 obtained from the output scanner arrangements 9 in FIG. 1C. In this so-called decoding process, all touch signatures P1, P2 are identified in the transmission signals S1, S2. For each touch signature P1, P2, an attenuation path is determined, typically by tracing the center of the touch signature P1, P2 back to the corresponding entry point. In FIG. 2C, the back-traced center rays are illustrated by dashed lines. The location of the touching object 6 is given by the intersection of the center rays.

The present Applicant has now realized that the decoding process may be improved by deliberately causing the propagating light to be scattered at one or both of the boundary surfaces 4, 5 of the light transmissive panel 1 (FIG. 1), provided that the decoding process is appropriately designed to take the effects of scattering into account.

The scattering may be caused by a diffusing surface structure, also called an anti-glare (AG) structure, on the touch surface 4. An AG structure may be used to reduce glares from external lighting on the touch surface. Further, when the touching object is a naked finger, the contact between the finger and the touch surface normally leaves a fingerprint on the touch surface. On a perfectly flat surface, such fingerprints are clearly visible and usually unwanted. By adding an AG structure to the touch surface, the visibility of fingerprints is reduced. Furthermore, the friction between the finger and the touch surface decreases when an AG structure is used, which may thus improve the user experience. AG structures are specified in gloss units (GU), where lower GU values result in less glares.

When a beam of light propagates by internal reflection in a light transmissive panel that has an AG structure on one or both of its boundary surfaces, each internal reflection against such a scattering boundary surface will cause some light to be diverted away from the main direction of the beam and may also cause radiation to escape through the boundary surface. Thus, the provision of an AG structure generally causes the beam to be broadened in the plane of the panel as the beam propagates from its entry point(s) on the panel.

Figure 3A:
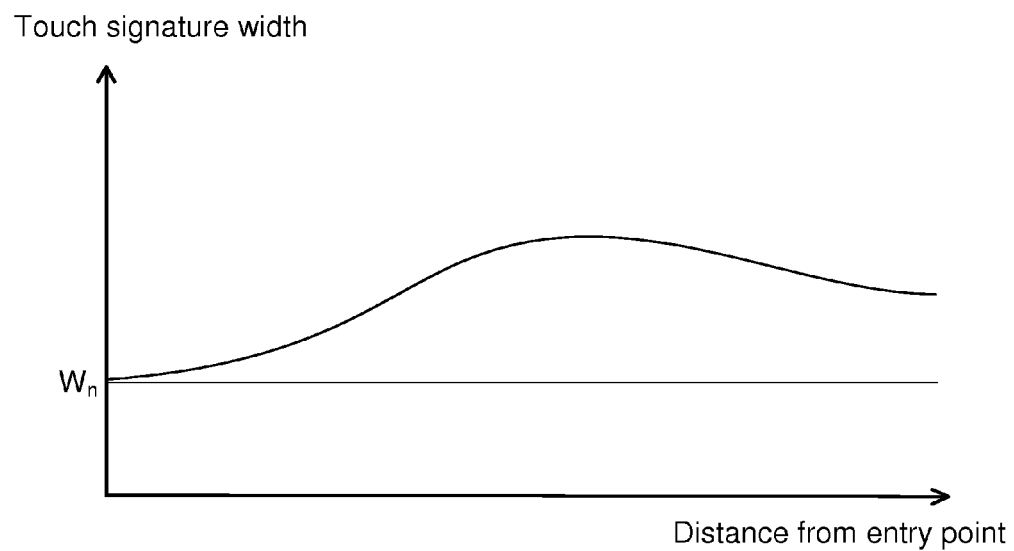
FIGS. 3A-3B are graphs of dispersion functions caused by scattering in a touch-sensing apparatus.

This broadening causes the shape of the touch signature in the spatial transmission signal to depend on the location of the touching object on the panel, specifically the distance between the touching object and the relevant incoupling/entry point. FIG. 3A illustrates an exemplifying dependence between the width of the touch signature caused by a touching object and the distance between the touching object and the entry point. The factual width of the touching object is $W_n$. When the touching object is located close to the entry point, the detected touch signature will be distinct and have a width similar to the factual width. As the touching object is moved away from the entry point, the detected touch signature will gradually broaden. Close to the outcoupling point, the width of the touch signature may again become slightly smaller. It is to be understood that the actual functional dependence between width and touch location is greatly dependent on the actual optical design of the touch-sensing apparatus, and that FIG. 3A is merely given as an example.

Figure 3B:
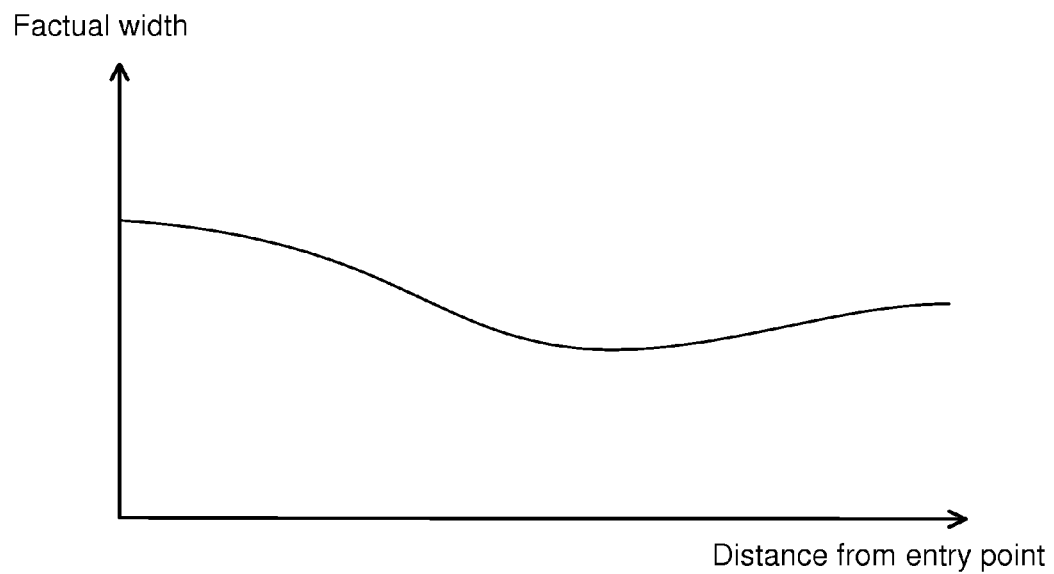

In FIG. 3A, it can be seen that a small touching object located centrally between the entry and outcoupling points will yield the same touch signature width as a larger touching object located closer to the entry point. Based on the data in FIG. 3A, it is possible to determine the factual width of a touching object that yields a certain touch signature width, as a function of the distance between the touching object and the entry point. This type of functional dependence is denoted dispersion function in the following. FIG. 3B is a graph of a dispersion function determined for the data in FIG. 3A. Thus, FIG. 3B illustrates the factual object width at different locations that will generate the same touch signature width in the spatial transmission signal. As will be further explained in the following, such a dispersion function can be used to improve the precision and/or consistency in determining the location and/or size of one or more touching objects.

The origin of the dispersion function will now be further explained in relation to the scan beam embodiment of FIG. 1C. To understand the behaviour of a specific touch-sensing apparatus, it is necessary to analyse its optical design. The shape of the diverging set of rays from the entry point depends on many different factors, e.g. panel thickness, internal angle of incidence onto the boundary surfaces, AG structure, etc. The resulting touch signature depends, apart from the diverging set of rays, on a number of other factors, e.g. detector surface area, detector numerical aperture, cross-section of injected light, etc. When beams are swept parallel to the edges of the panel, detector-specific parameters typically have more impact on the touch signature for touch locations close to the outcoupling point. Conversely, emitter-specific properties mainly affect the touch signature for touch locations close to the entry point.

Figure 4A:
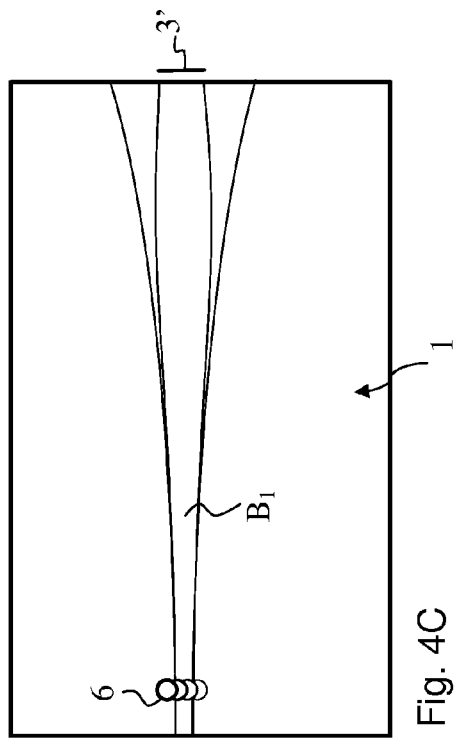
FIGS. 4A-4D are top plan views of a beam propagating inside a light transmissive panel, serving to illustrate the origin of the dispersion functions in FIGS. 3A-3B.

As explained above, a beam of light that is transmitted through the panel will be broadened each time it interacts with the AG structure. FIG. 4A is a plan view of the panel 1 in which a beam B1 is injected at an entry side and propagates to an outcoupling side. At the outcoupling side, the energy of the beam B1 is sensed within a confined area (indicated by 3' and denoted "receiving area" in the following). The length of the receiving area 3' is dependent on the numerical aperture of the light sensor arrangement (e.g. the output scanner arrangement 9 in FIG. 1C), i.e. the range of angles over which the light sensor arrangement can accept light.

As shown in FIG. 4A, the beam B1 diverges as it propagates through the panel. Since the receiving area 3' has a finite length, it will only receive the central parts of the diverging beam B1 that reaches the outcoupling side. FIG. 4B indicates the outer rays that reach the receiving area 3'.

Figure 4C:
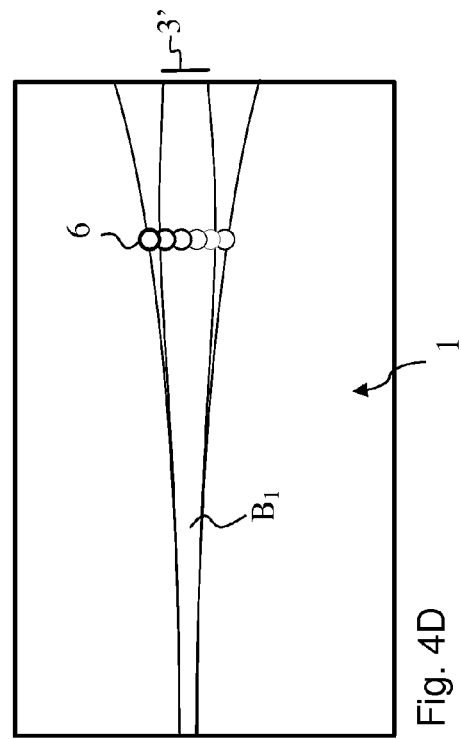
Figure 4B:
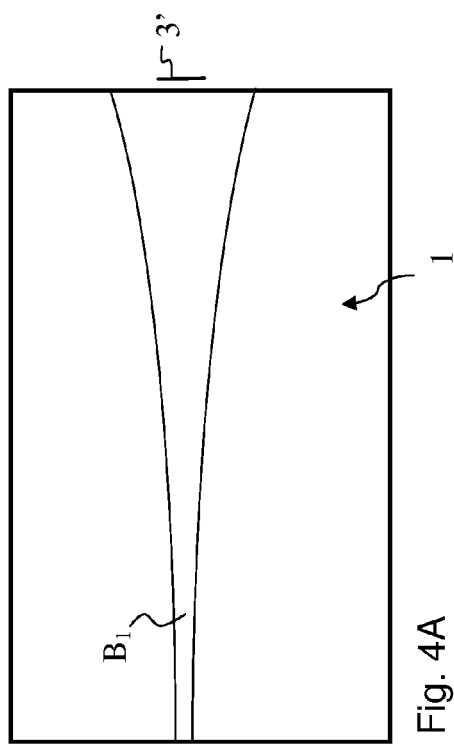

FIG. 4C illustrates the situation when an object 6 touches the panel 1 close to the entry side, in this example the left side. For simplicity, we consider a touching object 6 that moves with respect to the beam B1, but the conclusions will be equally applicable for a stationary touching object and a moving beam (as in the scan beam embodiment). Four different locations of the touching object 6 are shown in the left-hand part of FIG. 4C. Clearly, the touching object 6 interacts with the beam B1 over a short distance. FIG. 4C also indicates that the touching object 6 interacts with a large part of the beam B1. Thus, the resulting touch signature will be narrow (small width) and strong (low transmission).

Figure 4D:
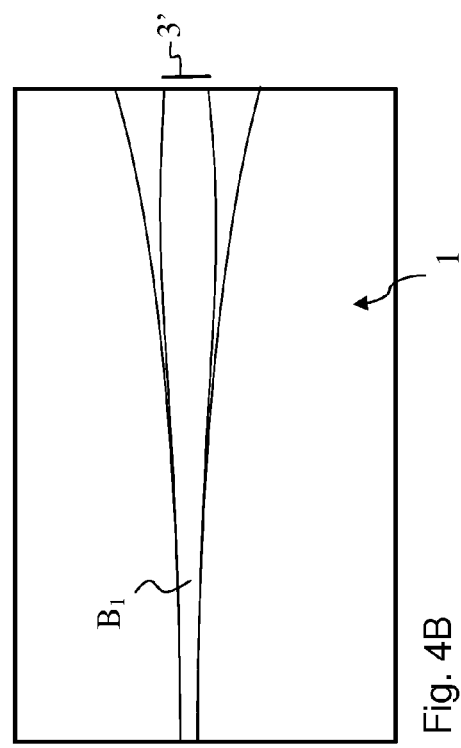

FIG. 4D illustrates the situation when the object 6 touches the panel 1 further away from the entry side. Clearly, the touching object 6 interacts with the beam B1 over a longer distance. It is also seen that the touching object 6 interacts with a smaller portion of the beam B1. Therefore, the resulting touch signature will be wider and weaker.

In the example of FIG. 4, the width of the touch signature will decrease slightly for locations to the right of the touching object 6 in FIG. 4D. Such signature behaviour is also illustrated in the graph of FIG. 3A. It should be noted that such a decrease in signature width is only observed when the length of the receiving area 3' is smaller than the width of the dispersed beam at the outcoupling side (e.g. as shown in FIG. 4A). For example, in the above-mentioned variant where a single elongate sensor is arranged at the outcoupling side instead of the output scanner arrangement, a decrease in touch signature width is unlikely to be observed.

Above, it was shown that the width and height of a touch signature changes with the location of the touching object due to the effects of scattering. Below, it will now be explained how the resulting dispersion function can be used to improve the decoding process. For reasons of explanation, the dispersive effects are slightly exaggerated in the figures accompanying the following disclosure.

Decoding in Scan Beam Embodiments

FIGS. 5A-5D illustrate a scan beam embodiment, in which three collimated non-parallel beams are swept (translated) across the panel, resulting in three transmission signals.

Figure 5C:
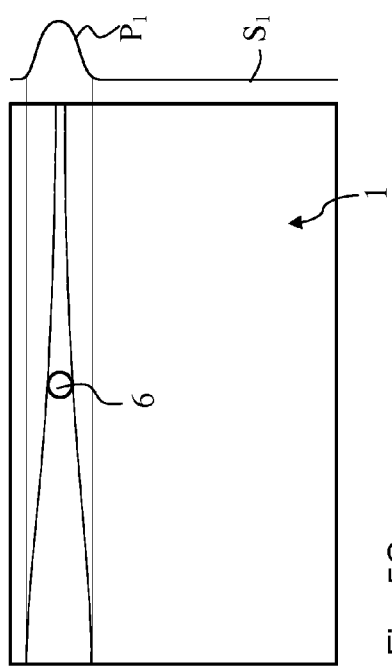
FIGS. 5A-5D are top plan views of a scan beam embodiment, to illustrate a reconstruction of attenuation paths.
Figure 5D:
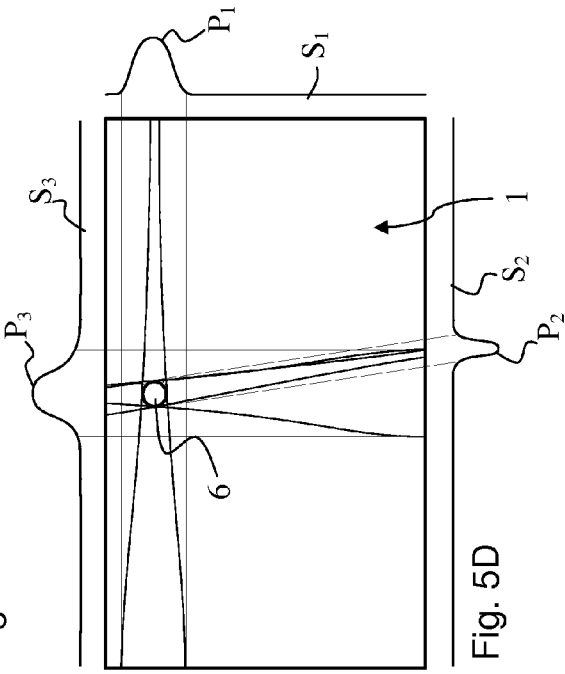
Figure 5A:
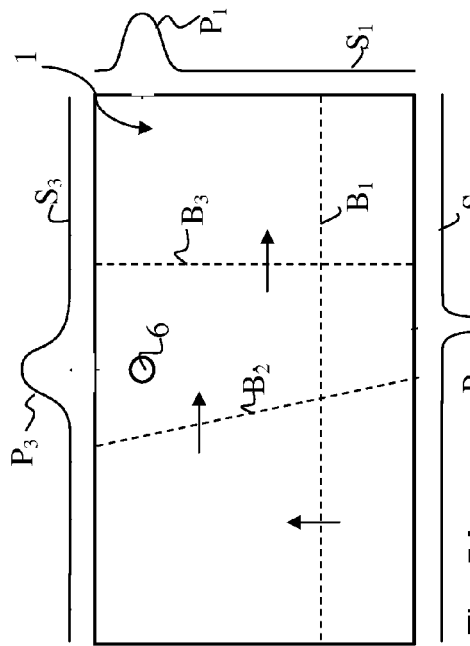

FIG. 5A illustrates the three beams B1-B3 and the resulting spatial transmission signals S1-S3. A first beam B1, which is parallel to the top and bottom edges of the panel 1, is injected at the left side and detected at the right side of the panel 1, while being swept from the bottom to the top (or vice versa). The resulting transmission signal S1 is shown to the right side of the panel 1. A second beam B2, with a scan angle which is non-parallel to the edges of the panel 1, is injected at the top and is detected at the bottom, while being swept from left to right (or vice versa). The resulting transmission signal S2 is shown at the bottom. A third beam B3, which is parallel to the left and right edges of the panel 1, is injected at the bottom and detected at the top, while being swept from left to right (or vice versa). The resulting transmission signal S3 is shown at the top. Each transmission signal S1-S3 contains a respective touch signature P1-P3, resulting from the touching object 6.

Figure 5B:
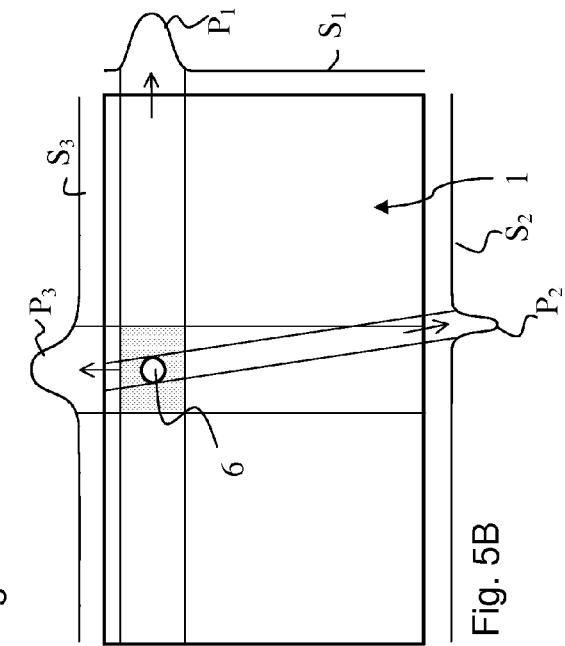

FIG. 5B illustrates the attenuated paths determined based on the touch signatures P1-P3, without considering the signal dispersion caused by scattering. Here, the attenuated paths have been reconstructed by tracing the limits of the touch signatures P1-P3 back to the corresponding entry points, as illustrated by the straight parallel lines extending from the limits of each peak P1-P3 along the associated beam path. Clearly, there is an inconsistency in the estimated size of the touching object 6 at the intersection of the attenuated paths.

FIG. 5C illustrates the reconstruction of the attenuation path for the first beam B1 in FIG. 5A, using a dispersion function determined for this scan beam embodiment. The dispersion function may be calculated theoretically or may be derived from measured data. FIG. 5C includes two dispersion lines showing the factual width of a touching object 6 yielding the detected touch signature width as a function of the distance from the entry point. It is seen that if the touching object 6 is located close to the entry point, the factual width is essentially equal to the width of the touch signature. If the touching object 6 is located farther away from the entry point, its factual width has to be smaller in order to generate the detected touch signature P1.

FIG. 5D illustrates the reconstructed attenuation paths for the touch signatures P1-P3 in the transmission signals S1-S3 generated by the beams B1-B3, by applying the dispersion function to the width of each touch signature P1-P3. Clearly, the resulting factual widths at the intersection of the attenuated paths are consistent. Thus, by applying the dispersion function, it is possible to verify the determined position by checking the consistency of the factual widths at the intersection.

As will be shown in the following, further advantages may be obtained when spatial transmission signals are processed to determine the locations of two or more touching objects on the panel. These advantages will be explained in relation to a scan beam embodiment shown in FIGS. 6A-6B. In this embodiment, two collimated beams B1, B2 are swept (translated) across the panel, resulting in two spatial transmission signals S1, S2. A first transmission signal S1 is generated by sensing the transmitted energy of a beam B1 which is parallel to the top and bottom edges of the panel 1 and which is injected at the left side and outcoupled at the right side of the panel 1. A second transmission signal S2 is generated by sensing the transmitted energy of a beam B2 which is parallel to the left and right edges of the panel 1 and which is injected at the bottom side and outcoupled at the top side of the panel 1.

Figure 6A:
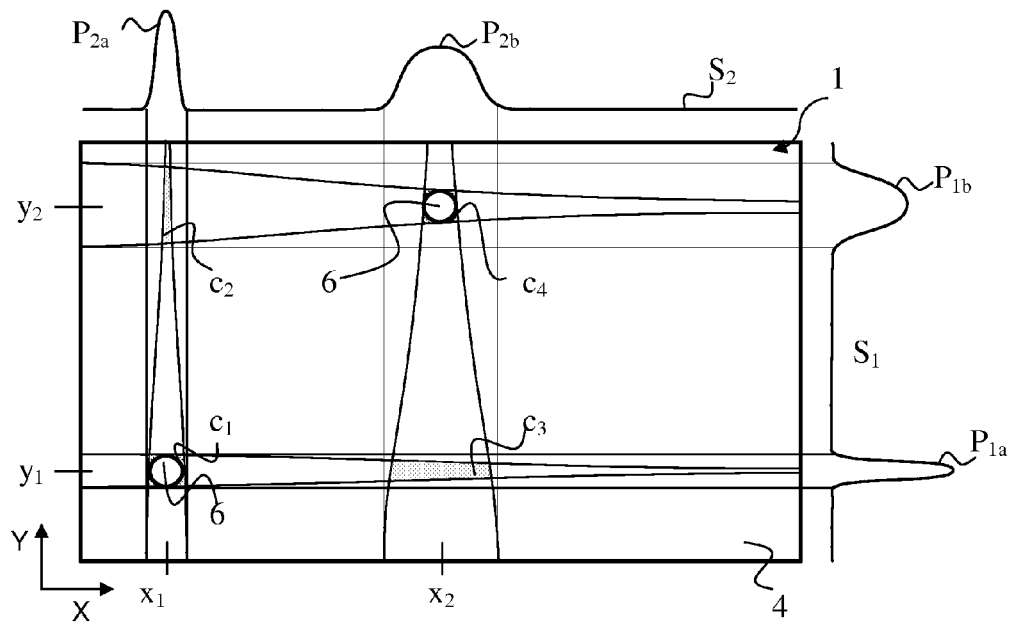
FIGS. 6A-6B are top plan views of another scan beam embodiment, to illustrate a reconstruction of attenuation paths.

In FIG. 6A, each transmission signal S1, S2 contains two touch signatures P1a, P1b, P2a, P2b, each resulting from one of the touching objects 6. FIG. 6A also illustrates the attenuation paths (corrected attenuation paths) that have been reconstructed based on the touch signatures P1a, P1b, P2a, P2b while applying the dispersion function for this embodiment. FIG. 6A also illustrates the attenuation paths (uncorrected attenuation paths) that are obtained without applying the dispersion function. The attenuation paths form four polygonal intersections, with each intersection being a candidate location c1-c4. Looking at the corrected attenuation paths, it can be seen that two of the intersections are almost square whereas the other two intersections are thin and elongate. If the touching objects 6 are known to be approximately regular in shape, it can be concluded that the touching objects are located at the square intersections c1, c4. Thus, based on the shape/area of the intersections, true locations can be distinguished from ghost locations among the candidate locations in a multi-touch scenario.

Figure 6B:
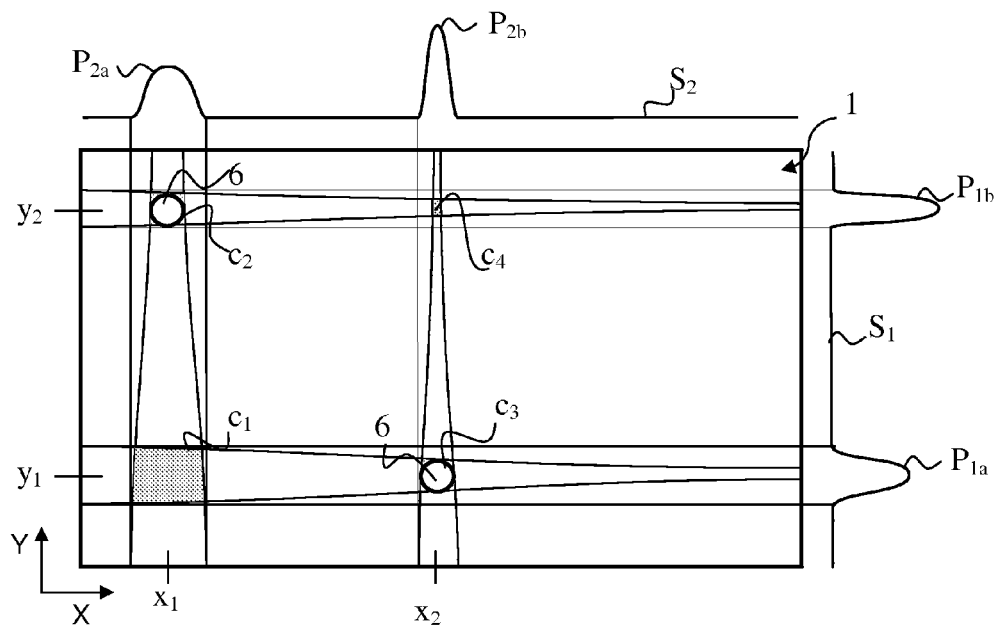

FIG. 6B illustrates the spatial transmission signals S1, S2 that are generated when the two touching objects 6 are located at the ghost locations in FIG. 6A. Looking at the corrected attenuation paths, it can again be seen that the intersections that correspond to the touching objects 6 are almost square and have similar areas. The intersections c1, c4 at the ghost points are also square, but one intersection has a very small area, and the other intersection has a significantly larger area. Thus, by assessing the areas of the intersections c1-c4, it is possible to determine the two most probable touch locations. It should be realized that it would be much more difficult, if not impossible, to distinguish between true locations and ghost locations based on the uncorrected attenuation paths, since all intersections would have approximately the same shape and area.

Figure 7:
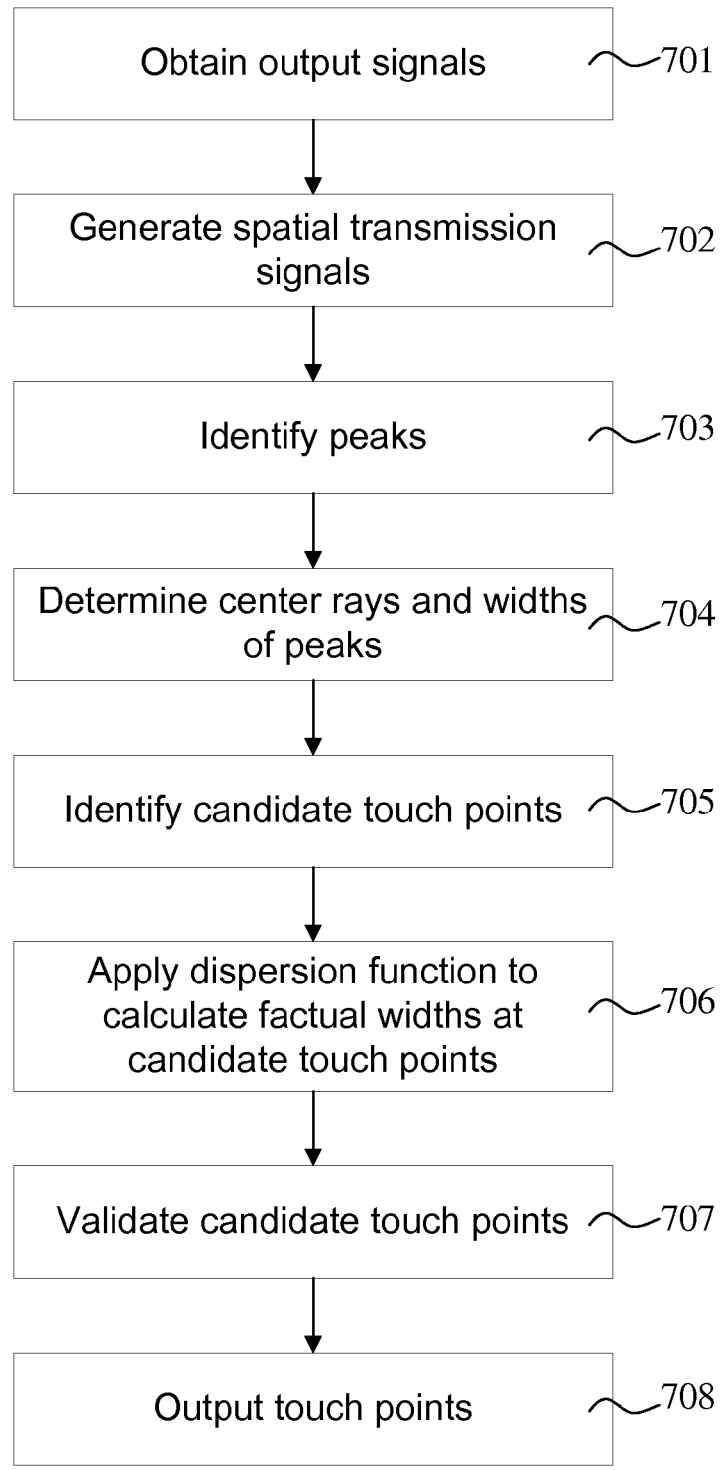
FIG. 7 is a flow chart of an exemplary decoding process.

FIG. 7 is a flow chart for an exemplifying decoding process that may be used to identify touch locations in any one of the above-described scan beam arrangements.

In step 701, the process obtains the output signals from the light sensors, typically by sampling data values from the output signal at given time intervals.

Then, in step 702, the output signals are processed to form a sample vector for each sheet of light, each sample vector including a set of data values associated with different time points. Depending on implementation, this processing may involve filtering the output signals for suppression of noise and/or ambient light, combining output signals from different sensors, interpolating the output signals, etc. The sample vector is then used as a spatial transmission signal, optionally after dividing the sample vector with background data. The background data may be a corresponding sample vector that represents the received energy without any object touching the touch surface. The background data may be pre-set or obtained during a separate calibration step.

In step 703, each spatial transmission signal is processed to identify one or more peaks that may originate from touching objects. The identified peaks correspond to the above-discussed touch signatures.

In step 704, the center point of each peak is identified. This step may or may not involve interpolating the data values in the transmission signal. Using the center point, and knowing the scan angle of the beam at each data value in the spatial transmission signal, the process determines a center ray (cf. FIG. 2C) for each center point. Further, the width of each peak in the spatial transmission signals is determined.

In step 705, the intersections between the center rays are determined by triangulation. These intersections form candidate touch points.

In step 706, the factual width at each intersection is calculated for each peak in the transmission signal, using a dispersion function and the peak width. For example, the peak width and location data for an intersection may be input to a function of the type shown in FIG. 3B, to output the factual width at the intersection. Thus, step 706 results in width data for each candidate touch point.

In step 707, the process determines the most probable set of true touch points among the candidate touch points. As indicated in the foregoing, the true touch points may be identified by calculating an area value for each candidate touch point and matching the area values to an area measure, or by calculating a shape value for each candidate touch point and matching the shape values to a shape measure, or a combination thereof.

In step 708, the true touch points are output by the process.

To further exemplify the validation step 707, we consider the situation in FIG. 6A. After applying the above steps 701-706, the process has determined four candidate touch points: $c1=(x1, y1)$, $c2=(x1, y2)$, $c3=(x2, y1)$, and $c4=(x2, y2)$, and corresponding width data for each candidate point $(w_x, w_y)$. A first validation sub-step may be configured to test for ghost points that have an elongated shape. For each candidate point, the ratio $r=\min(w_x, w_y)/\max(w_x, w_y)$ is calculated using the width data. If the ratio r is significantly smaller for top-left and bottom-right candidate touch points c2, c3, the process concludes that the top-right and bottom-left candidate touch points c4, c1 are the true touch points. A second validation sub-step may be configured to compute the area of the candidate points, e.g. as $w_x * w_y$. If the bottom-left candidate touch point c1 is significantly larger than the other candidate touch points, at the same time as the top-right candidate point c4 is smaller than the other candidate touch points, the process concludes that the bottom-left and top-right candidate touch points c1, c4 are ghost points (cf. FIG. 6B). In a simplified validation example, the process could be configured to validate only the top-left candidate point c2 or the bottom-right candidate point c4 according to the first validation sub-step. The skilled person understands that there are numerous alternative implementations of the validation step 707, depending e.g. on the number of touches to be resolved, the dispersion function, the shape and area of the objects, the shape and area variations among the objects, etc.

The above example demonstrates that it is generally possible to improve the decoding process by applying a dispersion function in the reconstruction of attenuation paths based on spatial transmission signals generated by sweeping a number of collimated non-parallel beams inside a light transmissive panel.

In the example of FIG. 7, a center ray is first reconstructed for each touch signature by geometrically retracing a center point of the touch signature to a corresponding entry point (step 704). Then, a set of candidate touch points is determined by triangulating the reconstructed center rays (step 705), whereupon the dispersion function is applied to determine factual widths at each candidate touch point (step 706). Thus, the corrected attenuation path is only determined at the candidate touch points.

In a variant (not shown), corrected attenuation paths are determined before the triangulation, i.e. the dispersion function is first applied to reconstruct the full attenuation path from the outcoupling side to the entry side. Then, the full attenuation paths are intersected in a triangulation step, which thus results in both the locations and the factual widths of the candidate touch points.

The skilled person realizes that there are many variants and alternatives to the above-described decoding process. For example, the spatial transmission signals may be generated to represent only part of the sample vector. For example, steps 702 and 703 may be combined such that touch signatures are first identified in the sample vectors, whereupon spatial transmission signals are generated only for one of more sample points within the touch signatures in the sample vectors.

Still further, the corrected attenuation paths may be calculated at a reduced accuracy or resolution, e.g. by approximating the outer limits of the corrected attenuation paths by a straight line.

Also, the decoding process may be based on any available image reconstruction algorithm, and especially few-view algorithms that are used in, e.g., the field of tomography. Any such algorithm can be modified to account for dispersion, as long as the dispersion function is known.

Decoding in Fan Beam Embodiments

In the following, the use of the dispersion function in the decoding process will be discussed in relation to fan beam embodiments. One difference compared to the scan beam embodiments is that the fan beam generally originates from a smaller incoupling site and expands in the plane of the panel even in the absence of scattering, i.e. without an AG structure. Thus, in a fan beam embodiment, the touch signatures contain information about the distance between the entry point and the touching object, even if the panel is not provided with an AG structure. However, the presence of scattering causes the fan beam to broaden in the plane of the panel while propagating from the incoupling site towards the outcoupling site. Thus, a dispersion function can be measured or calculated for a specific fan beam embodiment. By providing scattering and by taking the resulting dispersion function into account, it is possible to eliminate inconsistencies that may occur when evaluating the intersections of reconstructed attenuation paths in the decoding process. The basic principle for applying the dispersion function is the same as in the scan beam embodiments. This will be further explained with reference to FIGS. 8A-8D.

In the example of FIGS. 8A-8D, the panel is internally illuminated by two fan beams. Although not shown on the drawings, several sensors are arranged at two sides of the panel to measure the transmitted energy of the sheets of light formed by the fan beams.

Figure 8A:
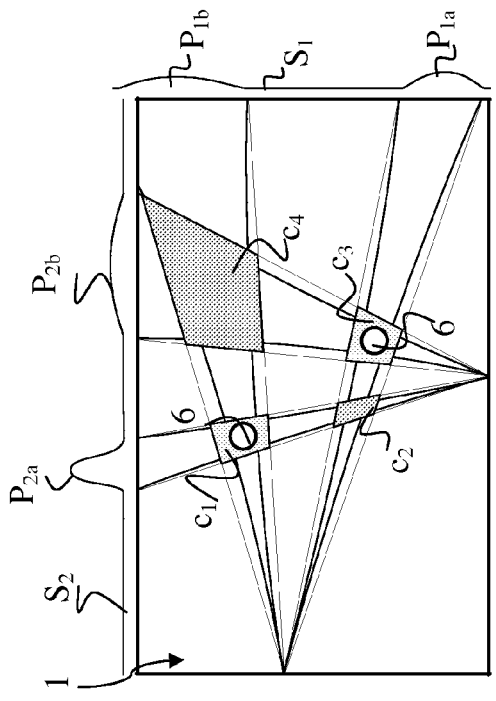
FIGS. 8A-8D are top plan views of a fan beam embodiment, to illustrate a reconstruction of attenuation paths.

FIG. 8A illustrates a touch-sensing apparatus with no AG structure on the boundary surfaces. The thin lines indicate the boundaries of the light cones from two different emitters (not shown) that interact with two touching objects 6. It should be noted that although the light cones are drawn as if they originate from a singularity (i.e. a single incoupling point), in practice they generally originate from an extended incoupling site that may include more than one incoupling point for the decoding process. FIG. 8A also illustrates the intersections of attenuation paths that are reconstructed from the resulting touch signatures P1$a$, P1$b$, P2$a$, P2$b$ in the transmission signals S1, S2. The intersections form four candidate locations c1-c4, of which at least three are similar in size. Thus, it may be difficult to identify the true locations based on the touch signatures.

Figure 8B:
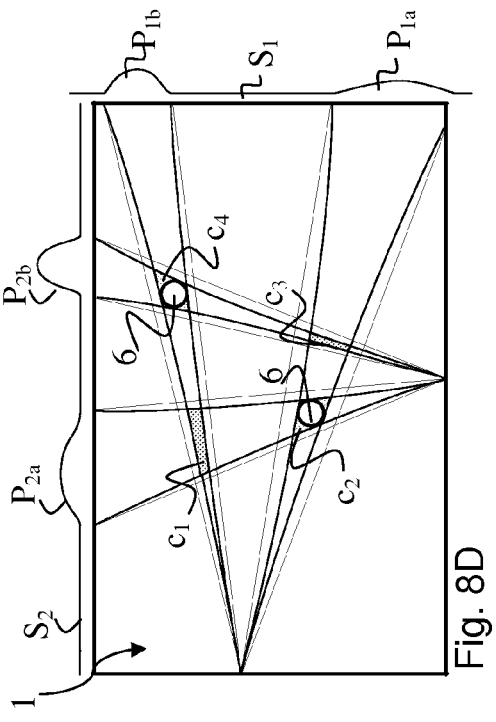

FIG. 8B illustrates the spatial transmission signals S1, S2 obtained in the touch-sensing apparatus of FIG. 8A if at least one of its boundary surfaces is provided with an AG structure. Compared to FIG. 8A, FIG. 8B shows that the touch signatures P1$a$, P1$b$, P2$a$, P2$b$ have become wider and slightly weaker as a result of the scattering. FIG. 8B indicates the light cones (in thin lines) that interact with the objects 6, as well as the corrected attenuation paths (in thicker lines), which are obtained by applying the appropriate dispersion function to the touch signatures P1$a$, P1$b$, P2$a$, P2$b$ in the transmission signals S1, S2. Compared to FIG. 8A, the intersections at the true locations c1, c3 (i.e. the locations of the touching objects 6) remain essentially unchanged, whereas the areas of the intersections at the ghost locations c2, c4 change considerably (decreasing and increasing in area, respectively). Both of these changes in intersection area make it easier to distinguish true locations from ghost locations among the candidate locations in a multi-touch scenario.

Figure 8C:
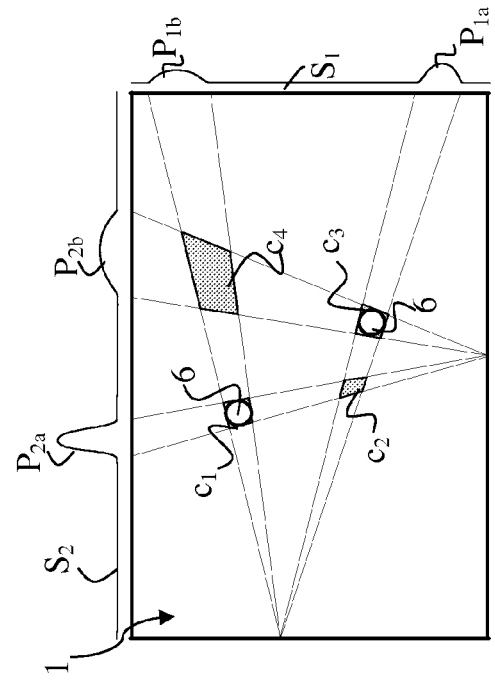

FIG. 8C further illustrate the areas of the intersections between uncorrected attenuation paths (i.e. the aforesaid light cones) in the touch-sensing apparatus of FIG. 8B. Clearly, the size of the touches will be incorrectly estimated if the dispersion function is not taken into account.

Figure 8D:
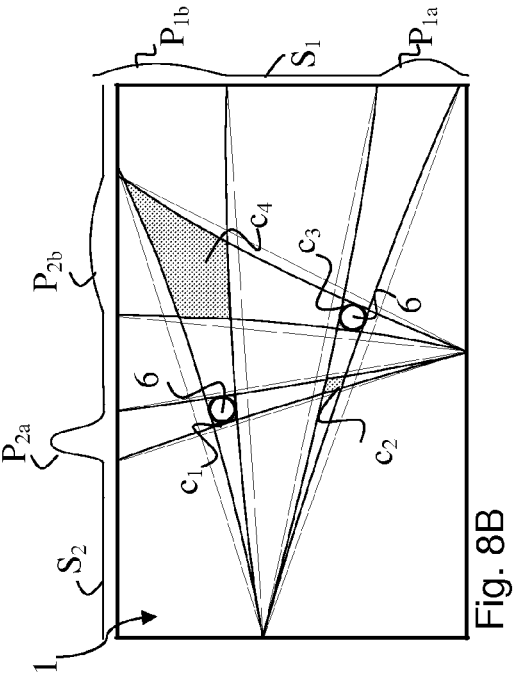

FIG. 8D illustrates the spatial transmission signals S1, S2 that are generated when the two touching objects 6 are located at the ghost locations c2, c4 in FIG. 8C. Looking at the corrected attenuations paths (in thicker lines), it can be seen that the intersections that correspond to the touching objects 6 have essentially the same shape and area, whereas the intersections at the ghost locations c1, c3 are thin and elongate. Clearly, based on the shape/area of the intersections, true locations can be distinguished from ghost locations among the candidate locations in a multi-touch scenario.

The decoding process could be implemented according to any of the decoding embodiments discussed above in relation to the scan beam embodiments, e.g. according the process shown in FIG. 7. In such a process, a center ray is first reconstructed for each touch signature by geometrically retracing a center point of the touch signature to a corresponding entry point. Then, a set of candidate touch points is determined by triangulating the reconstructed center rays, whereupon the factual width at each candidate touch point is determined by applying a geometric function to reconstruct the uncorrected fan beam width at the candidate touch point (resulting in the width between the outer lines at each intersection c1-c4 in FIG. 8B) and by applying the dispersion function to modify the thus-determined fan beam width (resulting in the width between the inner lines at each intersection c1-c4 in FIG. 8B), or vice versa. Alternatively, the geometric function and the dispersion function could be combined into a single correction function which is applied to determine the factual widths.

In a variant (not shown), corrected attenuation paths are determined before the triangulation, i.e. the geometric function and the dispersion function are first applied to reconstruct the full attenuation path from the outcoupling side to the entry point. Then, the full attenuation paths are intersected in a triangulation step, which thus results in both the locations and the factual widths of the candidate touch points.

Obtaining the Dispersion Function

Figure 9:
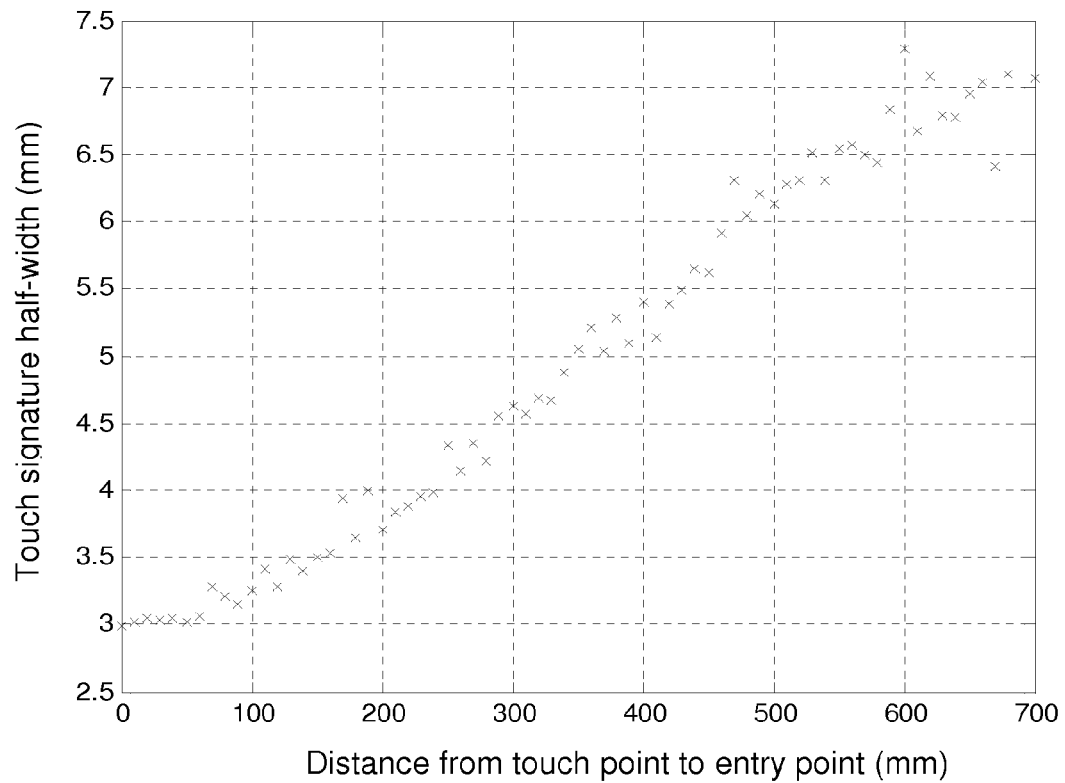
FIG. 9 is a graph of a dispersion function based on measurement data.

As mentioned above, the dispersion function can be obtained by either theoretical calculations for a specific touch-sensing apparatus or by measurements. FIG. 9 is a graph of measurement data obtained from a scan beam embodiment of the type shown in FIG. 6, wherein the measurement data has been obtained for a rectangular light transmissive panel with a 37 inch diameter. The graph shows the measured half-width of the touch signature as a function of the distance between the entry point (e.g. located on the left side of the panel in FIG. 6A) and the touching object. Thus, this graph corresponds to the graph in FIG. 3A. The touch signature width is clearly dependent on the distance from the entry point (and also on the distance to the outcoupling point). In this particular example, there is no decrease in touch signature width when the touching object is located close to the outcoupling point. The dispersion function may be given by the actual measurement data, suitably after recalculation into a function as shown in FIG. 3B, or the dispersion function may be derived based on a suitable function that is fitted to the measurement data. Such a fitted function may be linear, polygonal, spline, etc It should also be noted that a corresponding dispersion function can be measured without any difficulty in a fan beam embodiment.

General

Figure 10:
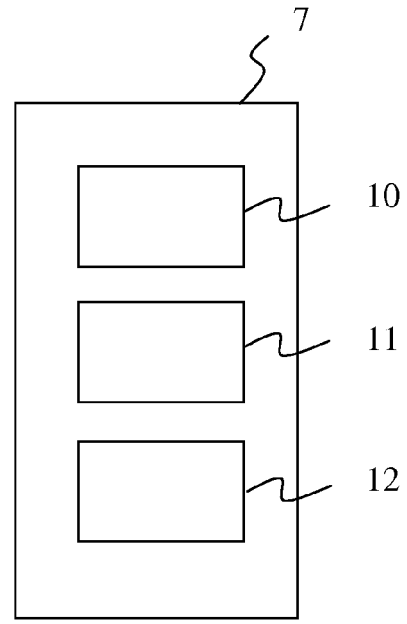
FIG. 10 is a block diagram of an embodiment of a device for determining touch locations.

The decoding process is typically executed by a data processing device (cf. 7 in FIG. 1A) connected to receive the output signal(s) of the sensor(s). An example of such a data processing device 7 is shown in FIG. 10. In the illustrated example, the device includes an element (or means) 10 for identifying, in the output signal(s), a set of touch signatures originating from touching objects. The device further includes an element (or means) 11 for determining at least part of an attenuated light path across the panel based on each touch signature, by applying the dispersion function as described in the foregoing. There is also provided an element (or means) 12 for identifying the positions of the touching objects on the touch surface based on the attenuated light paths. The device 7 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit serves as one element/means when executing one instruction, but serves as another element/means when executing another instruction. In addition, one element/means may be implemented by one instruction in some cases, but by a plurality of instructions in some other cases. Such a software controlled computing device may include one or more processing units, e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The computing device may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The computing device may include one or more communication interfaces, such as a serial interface, a parallel interface, a USB interface, a wireless interface, a network adapter, etc, as well as one or more data acquisition devices, such as an A/D converter. One or more I/O devices may be connected to the computing device, via a communication interface, including e.g. a keyboard, a mouse, a touch screen, a display, a printer, a disk drive, etc. The special-purpose software may be provided to the computing device on any suitable computer-readable medium, including a record medium, a read-only memory, or an electrical carrier signal.

In all of the above embodiments, the emitters 2 can operate in any suitable wavelength range, e.g. in the infrared or visible wavelength region. All sheets of light could be generated with identical wavelength. Alternatively, different sheets could be generated with light in different wavelength ranges, permitting differentiation between the sheets based on wavelength. Furthermore, the emitters 2 can output either continuous or pulsed radiation. Still further, the emitters 2 may be activated concurrently or sequentially. Any type of emitter capable of emitting light in a desired wavelength range could be used, for example a diode laser, a VCSEL (vertical-cavity surface-emitting laser), or an LED (light-emitting diode), an incandescent lamp, a halogen lamp, etc.

The transmitted energy may be measured by any type of light sensor 3 capable of converting light into an electrical signal. It should be noted that in the context of this specification, a "light sensor" implies a 0-dimensional light detector. Thus, the light sensor 3 may be a single light sensing element such as a photo-detector or a pixel on a CCD or CMOS detector. Alternatively, the light sensor 3 may be formed by a group of light sensing elements that are combined for 0-dimensional light detection, by summing/averaging the output of the individual elements in hardware or software.

The light transmissive panel 1 may be made of any material that transmits a sufficient amount of light in the relevant wavelength range to permit a sensible measurement of transmitted energy. Such material includes glass, poly(methyl methacrylate) (PMMA) and polycarbonates (PC). The panel 1 may be made of a single material or may be formed by layers of different materials. The internal reflections in the touch surface are caused by total internal reflection (TIR), resulting from a difference in refractive index between the material of the panel and the surrounding medium, typically air. The reflections in the opposite boundary surface may be caused either by TIR or by a reflective coating applied to the opposite boundary surface.

The AG structure may be provided as a dedicated layer attached to the touch surface. Alternatively, the AG structure may be integrated into the touch surface, e.g. by etching, engraving, stamping or moulding. Alternatively or additionally, the AG structure may be provided on the surface opposite to the touch surface. In certain embodiments, it may be advantageous for at least the touch surface to be provided with an AG structure, to avoid that deposition of contaminants (e.g. fingerprints) and formation of scratches causes the scattering, and thus the dispersion function, to change over time. With an AG structure on the touch surface, the touch-sensing apparatus will have inherently large signal dispersion, reducing the influence of additional sources of scattering, such as contaminants and scratches. It is also to be noted that in certain embodiments, both boundary surfaces of the panel may be used as touch surfaces. Furthermore, the desired scattering may be caused by other means than a dedicated AG structure, e.g. bulk scattering in the panel. In one example, a GU value of 10-200, e.g. 100-120, of one of the boundary surfaces of the panel would result in a sufficient amount of scattering for the purpose of the present invention.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

Figure 11A:
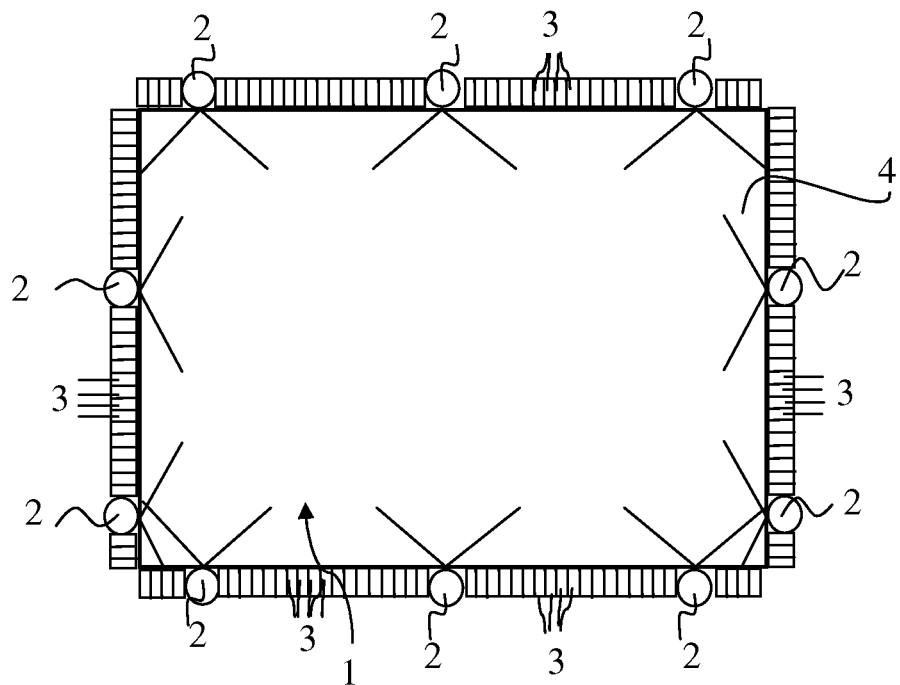
FIGS. 11A-11B are top plan views of hybrid embodiments.

For example, there are numerous other arrangements in which the process of decoding the output signals of light sensors can be improved by applying a dispersion function. One such alternative arrangement is shown in FIG. 11A, which is a variant of the fan beam embodiments discussed in the foregoing. Here, several light emitters 2 are arranged around the perimeter of the panel 1 to emit a respective fan beam (as indicated by diverging lines). The fan beam propagates inside the panel by TIR, at least in the touch surface 4. A large number of light sensors 3 are arranged around the perimeter to measure the received energy from the different sheets of light generated by the emitters 2. It has been found that the benefit from applying the dispersion function when reconstructing the attenuation paths increases with the number of fan beams, since the inconsistencies in area/shape for the ghost points will become larger and larger whilst the true touch points will have better and better correspondence in area/shape.

Figure 11B:
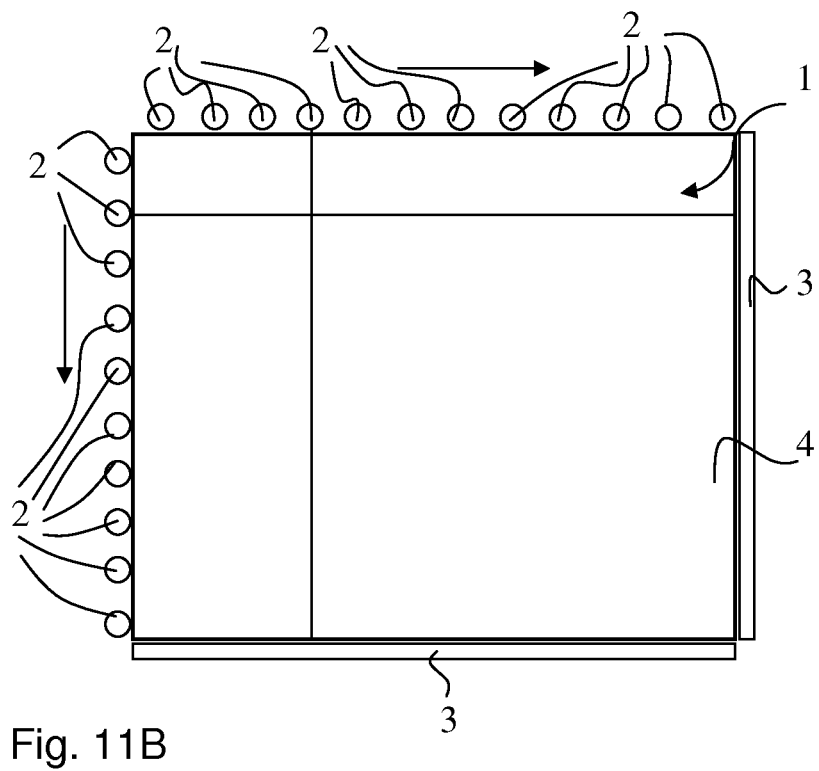

Another exemplifying arrangement is shown in FIG. 11B, which is a variant of the scan beam embodiments discussed in the foregoing. Here, two groups of light emitters 2 are arranged along two edges of the panel 1. Each emitter 2 is configured to emit a collimated beam that is coupled into the panel to propagate by TIR, at least in the touch surface 4. Within each group, the emitters 2 are activated sequentially, in any order. Thus, the emitters 2 may be activated to simulate a beam sweep, as in the scan beam embodiments. A respective elongate light sensor 3 is arranged at the opposite edges to measure the received energy from the different sheets of light generated by the emitters 2. It should be understood that the decoding process described for the above scan beam embodiments are equally applicable to this arrangement.

Further variants include hybrids of the fan beam and scan beam embodiments. One such hybrid (not shown) may be formed based on one of the above-described fan beam embodiments, by replacing one or more stationary emitters generating a fan beam with one or more stationary emitters generating a collimated beam. Another hybrid (not shown) may be formed based on one of the above-described scan beam embodiments, by sweeping fan beams or converging beams instead of collimated beams. The skilled person will readily realize how to implement the above teachings in the decoding process for the hybrid embodiments.

The invention claimed is:

1. A method in a touch-sensing apparatus, said apparatus comprising a light transmissive panel that defines a touch surface and an opposite surface, a light source arrangement for providing sheets of light inside the panel, wherein each sheet comprises light that propagates by internal reflection between the touch surface and the opposite surface-from one or more incoupling points to a set of outcoupling points, said apparatus further comprising a light sensor arrangement for generating one or more output signals that represent light reaching the outcoupling points, wherein the touch-sensing apparatus is configured such that an object touching the touch surface locally attenuates at least two sheets of light, said method comprising:
identifying, in said output signal(s), a set of signal profiles originating from said object,
determining at least part of an attenuated light path across the panel based on each signal profile, and
identifying the position of the object on the touch surface based on the thus-determined attenuated light paths,
wherein said determining comprises applying a width function which is representative of a dependence of signal profile width on distance to the incoupling point due to light scattering caused by a diffusing structure of at least one of the touch surface and the opposite surface,
wherein at least one of the sheets is generated in the form of a diverging beam originating at the one or more incoupling points, and
wherein said determining includes, for each signal profile associated with said at least one sheet generated in the form of a diverging beam,
identifying outcoupling points corresponding to limits of the signal profile,
reconstructing limiting rays of the attenuated light path by geometrically retracing the thus-identified outcoupling points to a respective incoupling point, and
modifying the distance between the limiting rays by applying said width function, thereby determining the attenuated light path.

2. The method of claim 1, wherein the width function represents the factual width of the object given the detected signal profile, as a function of distance to the incoupling point.

3. The method of claim 1, wherein at least one of the sheets is generated by sweeping an essentially collimated beam across a set of incoupling points.

4. The method of claim 1, wherein said determining further comprises, for each signal profile:
reconstructing a center ray of the attenuated light path by geometrically retracing a center point of the signal profile to one of said incoupling points,
determining a signal width of the signal profile, and
determining an object width at one or more candidate positions along the center ray by applying said width function, thereby determining part of said attenuated light path.

5. The method of claim 4, wherein said one or more candidate positions are determined by triangulation using a set of center rays that are reconstructed from said set of signal profiles.

6. A method in a touch-sensing apparatus, said apparatus comprising a light transmissive panel that defines a touch surface and an opposite surface, a light source arrangement for providing sheets of light inside the panel, wherein each sheet comprises light that propagates by internal reflection between the touch surface and the opposite surface-from one or more incoupling points to a set of outcoupling points, said apparatus further comprising a light sensor arrangement for generating one or more output signals that represent light reaching the outcoupling points, wherein the touch-sensing apparatus is configured such that an object touching the touch surface locally attenuates at least two sheets of light, said method comprising:
identifying, in said output signal(s), a set of signal profiles originating from said object,
determining at least part of an attenuated light path across the panel based on each signal profile,
generating a set of candidate positions based on the attenuated light paths, and
identifying the position of the object on the touch surface based on the generated set of candidate positions,
wherein said determining comprises applying a width function which is representative of a dependence of signal profile width on distance to the incoupling point due to light scattering caused by at least one of the touch surface and the opposite surface, and
wherein said identifying the positions includes,
calculating a shape measure and/or an area measure for at least one candidate position based on the thus-determined attenuated light paths, and
validating said at least one candidate position based on the shape measure and/or area measure.

7. The method of claim 6, wherein at least one of the sheets is generated in the form of a diverging beam originating at the one or more incoupling points.

8. A tangible computer readable medium comprising data processing system executable instructions which, when executed on a data-processing system, causes the data-processing system to carry out the method of claim 6.

9. The method of claim 6, wherein the width function represents the factual width of the object given the detected signal profile, as a function of distance to the incoupling point.

10. The method of claim 6, wherein at least one of the sheets is generated by sweeping an essentially collimated beam across a set of incoupling points.

11. A device for determining a position of an object on a touch surface included in a touch-sensing apparatus, said touch-sensing apparatus comprising a light transmissive panel that defines the touch surface and an opposite surface, a light source arrangement for providing sheets of light inside the panel, wherein each sheet comprises light that propagates by internal reflection between the touch surface and the opposite surface from one or more incoupling points to a set of outcoupling points, a light sensor arrangement for generating one or more output signals that represent light reaching the outcoupling points, wherein the touch-sensing apparatus is configured such that an object touching the touch surface locally attenuates at least two sheets of light, said device comprising:
an element for identifying, in said output signal(s), a set of signal profiles originating from the object,
an element for determining at least part of an attenuated light path across the panel based on each signal profile, and
an element for identifying the position of the object on the touch surface based on the thus-determined attenuated light paths,
wherein said element for determining is configured to apply a width function which is representative of a dependence of signal profile width on distance to the incoupling point due to light scattering caused by a diffusing structure of at least one of the touch surface and the opposite surface,
wherein at least one of the sheets is generated in the form of a diverging beam originating at the one or more incoupling points, and
wherein said element for determining is configured to, for each signal profile associated with said at least one sheet generated in the form of a diverging beam,
identify outcoupling points corresponding to limits of the signal profile,
reconstruct limiting rays of the attenuated light path by geometrically retracing the thus-identified outcoupling points to a respective incoupling point, and
modify the distance between the limiting rays by applying said width function, thereby determining the attenuated light path.

12. A touch-sensing apparatus, comprising:
a device for determining a position according to claim 11.

13. The device of claim 11, wherein the width function represents the factual width of the object given the detected signal profile, as a function of distance to the incoupling point.

14. The device of claim 11, wherein at least one of the sheets is generated by sweeping an essentially collimated beam across a set of incoupling points.

15. The device of claim 11, wherein said element for determining is configured to, for each signal profile:
reconstruct a center ray of the attenuated light path by geometrically retracing a center point of the signal profile to one of said incoupling points,
determine a signal width of the signal profile, and
determine an object width at one or more candidate positions along the center ray by applying said width function, thereby determining part of said attenuated light path.

16. The device of claim 15, further comprising an element for determining said one or more candidate positions by triangulation using a set of center rays that are reconstructed from said set of signal profiles.

17. A device for determining a position of an object on a touch surface included in a touch-sensing apparatus, said touch-sensing apparatus comprising a light transmissive panel that defines the touch surface and an opposite surface, a light source arrangement for providing sheets of light inside the panel, wherein each sheet comprises light that propagates by internal reflection between the touch surface and the opposite surface from one or more incoupling points to a set of outcoupling points, a light sensor arrangement for generating one or more output signals that represent light reaching the outcoupling points, wherein the touch-sensing apparatus is configured such that an object touching the touch surface locally attenuates at least two sheets of light, said device comprising:
an element for identifying, in said output signal(s), a set of signal profiles originating from the object,
an element for determining at least part of an attenuated light path across the panel based on each signal profile,
an element for generating a set of candidate positions based on the attenuated light paths across the panel, and
an element for identifying the position of the object on the touch surface based on the generated set of candidate positions,
wherein said element for determining is configured to apply a width function which is representative of a dependence of signal profile width on distance to the incoupling point due to light scattering caused by at least one of the touch surface and the opposite surface, and
wherein said element for identifying the positions is configured to,
calculate a shape measure and/or an area measure for at least one candidate position based on the thus-determined attenuated light paths, and
validate said at least one candidate position based on the shape measure and/or area measure.

18. The device of claim 17, wherein at least one of the sheets is generated in the form of a diverging beam originating at the one or more incoupling points.

19. The device of claim 17, wherein the width function represents the factual width of the object given the detected signal profile, as a function of distance to the incoupling point.

20. The device of claim 17, wherein at least one of the sheets is generated by sweeping an essentially collimated beam across a set of incoupling points.

* * * * *

UNITED STATES PATENT AND TRADEMARK OFFICE
CERTIFICATE OF CORRECTION

PATENT NO. : 8,482,547 B2
APPLICATION NO. : 12/737016
DATED : July 9, 2013
INVENTOR(S) : Tomas Christiansson et al.

It is certified that error appears in the above-identified patent and that said Letters Patent is hereby corrected as shown below:

On the title page item (75), should read:

(75) Inventors: Tomas Christiansson, Torna-Hallestad (SE); Ola Wassvik, Lund (SE); Jens Mattias Bryborn Krus, Lund (SE)

Signed and Sealed this
Twelfth Day of November, 2013

Teresa Stanek Rea
*Deputy Director of the United States Patent and Trademark Office*